US005712314A

United States Patent [19]

Surles et al.

[11] Patent Number: 5,712,314
[45] Date of Patent: Jan. 27, 1998

[54] FORMULATION FOR CREATING A PLIABLE RESIN PLUG

[75] Inventors: Billy Wayne Surles; Philip Daniel Fader, both of Houston, Tex.

[73] Assignee: Texaco Inc., White Plains, N.Y.

[21] Appl. No.: 695,388

[22] Filed: Aug. 9, 1996

[51] Int. Cl.$^6$ ................................ C08J 11/04; C09K 7/00
[52] U.S. Cl. .......................... 521/41; 523/130; 523/131; 523/156
[58] Field of Search ...................... 523/130, 131, 523/139, 156; 521/41

[56] References Cited

U.S. PATENT DOCUMENTS

| | | | |
|---|---|---|---|
| 2,345,611 | 4/1944 | Lerch et al. | 523/130 |
| 3,894,977 | 7/1975 | Brown et al. | 523/130 |
| 4,042,032 | 8/1977 | Anderson et al. | 166/276 |
| 4,427,069 | 1/1984 | Friedman | 166/295 |
| 4,699,543 | 10/1987 | Mio et al. | 404/109 |
| 4,800,960 | 1/1989 | Friedman et al. | 166/276 |
| 4,817,720 | 4/1989 | Friedman et al. | 166/295 |
| 4,842,072 | 6/1989 | Friedman et al. | 166/295 |
| 4,895,207 | 1/1990 | Friedman et al. | 166/276 |
| 4,898,750 | 2/1990 | Friedman et al. | 427/221 |
| 4,903,770 | 2/1990 | Friedman et al. | 166/288 |
| 4,938,287 | 7/1990 | Friedman et al. | 166/288 |
| 4,964,465 | 10/1990 | Surles | 166/295 |
| 5,005,647 | 4/1991 | Friedman et al. | 166/295 |
| 5,005,648 | 4/1991 | Friedman et al. | 166/295 |
| 5,010,953 | 4/1991 | Friedman et al. | 166/288 |
| 5,040,604 | 8/1991 | Friedman et al. | 166/295 |
| 5,159,980 | 11/1992 | Onan et al. | 166/294 |
| 5,199,490 | 4/1993 | Surles et al. | 166/270 |
| 5,199,492 | 4/1993 | Surles et al. | 166/295 |
| 5,284,206 | 2/1994 | Surles et al. | 166/270 |
| 5,285,849 | 2/1994 | Surles et al. | 166/295 |
| 5,293,939 | 3/1994 | Surles et al. | 166/295 |
| 5,377,759 | 1/1995 | Surles | 166/295 |
| 5,423,381 | 6/1995 | Surles et al. | 166/295 |
| 5,520,251 | 5/1996 | Surles et al. | 166/307 |
| 5,551,513 | 9/1996 | Surles et al. | 166/278 |
| 5,567,088 | 10/1996 | Shotts et al. | 405/270 |

OTHER PUBLICATIONS

"Furan Derivatives", Encyclopedia of Chemical Technology, vol. 11, pp. 510–516 Results of Lexis Search conducted on Nov. 27, 1996 by Carter White.

*Primary Examiner*—Vasu S. Jagannathan
*Assistant Examiner*—Olga Asinovsky
*Attorney, Agent, or Firm*—Henry H. Gibson; Stephen H. Cagle

[57] ABSTRACT

A resin composition useful in well completion and remedial methods having improved flexibility upon setting or curing is disclosed. The resin composition includes a polymerizable resin, an oil soluble acid catalyst capable of causing polymerization of the resin at formation temperatures, and 10 to 70% by volume rubber. The rubber may be in the form of ground rubber or an aqueous dispersion or emulsion. Also disclosed are methods for the use of the resin composition in well completion and remediation.

15 Claims, No Drawings

FORMULATION FOR CREATING A PLIABLE RESIN PLUG

FIELD OF THE INVENTION

This invention relates to oil and gas well completion methods and remedial methods, and to a novel composition which would be useful in the packing material, bridge plugs, and seal materials used in these methods. It also relates to thermosetting resin systems often used in sand and water control, and to the brittleness commonly found in the set resin. More particularly, it relates to a method of creating a low cost resin mixture which consolidates into a pliable solid mass for use in completion and remedial methods. Still more particularly this invention pertains to a method of mixing approximately 10% to 70% by volume rubber or latex with a furan resin system to create a composition which sets to form a product which possesses the chemical and thermal stability of the furan resin as well as properties of pliability and resilience contributed by rubber.

The composition utilizes rubber in a furan resin system to provide packing, seals, and plugs having high strength, elasticity, and resilience in addition to chemical resistance and low permeability.

BACKGROUND OF THE INVENTION

Formation treating methods for purposes of oil and gas well completion and remedial methods are well known, applying to procedures routinely practiced in the commercial production of petroleum.

A principle well completion technique which utilizes a resin or cement composition is known as primary well cementing. This involves placing a composition which will harden into the annulus between the walls of the wellbore and a conduit, e.g., casing, disposed therein, and allowing the composition to set therein, thus allowing the exterior surfaces of the conduit to bond to the walls of the wellbore. The bonding of the conduit within the wellbore serves to maintain the conduit in place and to prevent formation fluids from communicating between subterranean formations and zones, or to the surface by way of the annulus.

A problem frequently encountered in wells which requires remedial work is when leaks develop between the well interior and the formation. Oil wells are usually completed with a steel casing lining the well, and holes sometimes develop in the casing which allow undesired passage of fluid between well and formation. Leaks in the casing result from corrosion, shifts in earth formation, or because of failure in the cement used when installing the casing at the time the well was drilled. Any of theses occurrences can result in the passage of fluid from the formation into the well, which interferes with oil production; or passage of fluid from the well into earth formations which can result in loss of oil.

In the art cement compositions have be used in this application, however when primary cementing is carried out in wells in which high temperatures and/or high pressures are exerted on the casing or liners cemented therein, failure of the cement seal can occur with the result that pressurized fluids from subterranean formations or zones are allowed to flow there between or to the surface by way of the annulus.

In other well completion or remedial operations which typically utilize hydraulic cement compositions(e.g. secondary squeeze cementing and other similar operations wherein cracks, voids and other areas are filled with cements and sealed, or where temporary or permanent cement plugs are formed in the well), desired results are often not achieved because the set cement lacks resilience, high tensile strength, or acid and other chemical resistance.

It is known in the art to use thermosetting resins in sand and water control. One of the more successful resins used for formation treating has been a furfuryl alcohol resin, which can be polymerized to form a solid mass and is durable in the presence of high temperatures and caustic substances. This resin and variations of it have been used in a number of inventions. For example, U.S. Pat. No. 4,427,069 discloses a multistep process for consolidating sand adjacent to a wellbore with an acidic salt catalyst such as zirconyl chloride injected separately from the furfuryl alcohol oligomer.

U.S. Pat. No. 4,669,543 describes a sand consolidation method using an acid curable resin.

The pre-injection coating of gravel with a similar resin system is disclosed in U.S. Pat. No. 4,800,960. The resin system is preferably the furfuryl alcohol oligomer with ester and catalyst suspended in a carrier fluid and set by heat or pressure in the formation.

U.S. Pat. No. 4,842,072 teaches the injection of a polymerizable resin such as a furfuryl alcohol oligomer with an oil soluble nitrobenzoic acid catalyst and polar organic diluent such as butyl acetate.

U.S. Pat. No. 4,938,287 describes a process in which a preflush such as ethyl or butyl acetate is injected into the sand to be consolidated to remove oily residue, followed by injecting the treating fluid containing the polymerizable resin, diluent, ester and acid catalyst to accomplish sand consolidation.

In U.S. Pat. No. 4,903,770, there is disclosed an inexpensive process, wherein the polymer is more easily removed after use. This process employs a fluid comprising a polymerizable monomer such as furfuryl alcohol, a polar organic solvent such as methanol, and a strong, non-volatile acid catalyst such as sulfuric acid, mixed with steam to form a multiphase or aerosol treating fluid, all of which is injected into the formation to be consolidated. An ester such as ethyl or butyl acetate is incorporated in the fluid when the steam quality is less than 80%.

A system similar to U.S. Pat. No. 4,842,072 is disclosed in U.S. Pat. No. 5,005,648 to plug a particular zone of a formation without having paths for fluid flow. The reference discloses the injection of a furfuryl alcohol/acid catalyst/butyl acetate mixture into the formation without a subsequent brine injection step. Nitrobenzoic acid is disclosed as a preferred acid catalyst for formation temperatures greater than 250° F., while toluene sulfonic acid is disclosed as the preferred catalyst for temperatures less than about 250° F. U.S. Pat. No. 5,005,647 discloses a similar process for shutting off specific zones of flow.

Another furfuryl alcohol treating method is disclosed in U.S. Pat. No. 5,293,939, wherein the resin/catalyst fluid includes a solvent with a greater density than the resin. Further, U.S. Pat. No. 5,377,759, discloses a furfuryl alcohol treating method.

U.S. Pat. No. 5,010,953 teaches a sand consolidation process using a polymerizable compound such as furfuryl alcohol, a diluent such as a low molecular weight alcohol, an acid catalyst, an ester, and as an additive to reduce shrinkage, a copolymer of starch and a synthetic polymer such as acrylamide or acrylate.

U.S. Pat. No. 5,199,492 discloses a preflush of an organic solvent, preferably an ester such as butyl acetate, followed by the injection of a multiphase or aerosol treating fluid formed with a polymerizable oligomer, an ester, an acid catalyst, and a noncondensable gas. The well is shut in for a sufficient period of time to set a permeable barrier.

In U.S. Pat. No. 5,285,849, a formation treating method is disclosed using a fluid containing a polymerizable resin such as furfuryl alcohol, an acid catalyst such as toluene sulfonic acid or o-nitrobenzoic acid and an ester. The acid and acid concentration are selected to result in a polymerizable set time of 1-24 hours.

U.S. Pat. Nos. 4,427,069; 4,669,543; 4,800,960; 4,842,072; 4,938,287; 4,903,770; 5,005,648; 5,005,647; 5,239,939; 5,377,759; 5,010,953; 5,199,492; and 5,285,849, all assigned to Texaco Inc., are incorporated herein by reference in their entirety.

There is a need in the art for a low cost alternative to hydraulic cement or thermosetting resins for use in oil and gas well completion and remedial methods where cracks, voids, and other areas need to be filled in and sealed. There is an unfilled need for a composition which would provide pliability, improved resilience, and tensile strength, as well as chemical resistance and permeability.

In U.S. Pat. Nos. 5,159,980 and 5,293,938, assigned to Halliburton, there is disclosed a method of forming a temporary or permanent plug or seal in a wellbore or in one or more subterranean formations penetrated by the wellbore comprising the steps of:

a) placing a composition consisting essentially of a mixture of a slurry of a hydraulic cement and a vulcanizable rubber latex in one or more subterranean formations or in said wellbore at a desired location therein; and thereafter b) permitting said hydraulic cement to set and then causing said rubber latex to vulcanize and thereby form in said location a plug or seal which consists of a dual-state composite of a hardened cement and a solid rubber, wherein said vulcanizable rubber latex is comprised of an aqueous suspension of rubber, a vulcanizing agent and a vulcanizing activator selected from the group consisting of fatty acids, metallic oxide compounds and mixtures of such compounds.

The compositions of U.S. Pat. Nos. 5,159,980 and 5,293,938 require vulcanization. They are very different from the invention disclosed herein which does not require vulcanization. In the cited patents the vulcanization is employed in order to obtain greater heat resistance to high temperatures. The starting composition does not have temperature resistance as high as the resin of the present invention. In the present invention the composition initially has higher temperature resistance and through the methods of the present invention it is made more pliable, while maintaining the high temperature resistance.

Although a number of valuable methods have been developed for treating wells and, in many respects the described processes have been quite successful, a problem which exists with thermosetting resin systems, including the furan resin system, is that it can be brittle in its final cured state. There exists in the art a need for an improved, low cost, pumpable resin system for use in well completion and remedial methods which will set into an impermeable mass which provides improved seals and plugs having greater strength, elasticity, resilience, and pliability.

It would constitute a distinct advance in the art if there were a method available to create a low cost resin material which exhibits good chemical and thermal stability as well as pliability after setting.

SUMMARY OF THE INVENTION

In accordance with the foregoing the present invention is directed to a furan resin/rubber system which is pliable upon setting, which comprises:

a polymerizable resin, optionally, a polar organic diluent, an oil soluble acid catalyst capable of causing polymerization of the resin at formation temperatures, and about 10% to 70% by volume rubber.

In another embodiment the resin system may also contain latex. Where latex is added to the resin system, it is added in an approximate ratio of 1 to 4.

Other additives to the system may include fillers and extenders to improve certain properties.

The advantages of the composition, in addition to being pliable upon curing, include greater stability to higher temperatures, greater chemical stability, pressure confinement and imperviousness. Applications for the furan resin/rubber system include use as a permanent packing material, use as an element in inflatable packers, use as an external seal material to place between the casing and formation, use in surface equipment packers, or as seal material for pumps.

DETAILED DESCRIPTION OF THE INVENTION

The composition of the present invention is particularly suitable for performing a variety of well completion and remedial operations in subterranean formations and the wellbores penetrating formations. For example, the methods are suitable for performing squeeze remedial operations when a sealant is forced into cracks and/or voids to provide a seal therein. Other operations in which the methods are particularly suitable include, but are not limited to, repairing leaks which develop between the well interior and the formation, forming temporary or permanent plugs, or placing packers in wellbores, including horizontal wellbores.

The pliable resin seal system comprises:

a polymerizable resin;

optionally a polar organic diluent;

an oil soluble acid catalyst capable of causing polymerization of the resin at formation temperatures, and about 10% to 70% by volume rubber or about 1 part latex per 4 parts resin.

The preferred resin for use in our pliable resin system is a furfuryl alcohol oligomer. Any resin which will polymerize upon exposure to heat and contact with an acid catalyst can be used in this process; however, furfuryl alcohol oligomer $(C_4H_3OCH_2O)_n$ is the particularly preferred polymerizable resin. This resin has the advantage of being relatively inexpensive and having the characteristic of autopolymerizing on exposure to acid catalyst, forming a thermal setting resin which cures to an insoluble mass that is highly resistant to chemical attack as well as to thermal degradation. The particularly preferred commercial form in which this resin is available is QUACOR® 1300 marketed by QO Chemicals. This resin is ordinarily obtained commercially in a form containing 90 to 95 percent furfuryl alcohol oligomer. The furfuryl alcohol oligomer is from 40 to 60% by volume based on the total volume of the resin composition of the present invention.

The furfuryl alcohol oligomer emulsion utilized in our process is viscous so it is desirable in some applications be diluted with an appropriate solvent in order to permit it to be pumped into the formation, and to accomplish relatively complete filling of any void spaces in the formation. Any solvent for the furfuryl alcohol oligomer would accomplish this objective. It is possible, however, to accomplish this and another more important objective by using as the diluent a hydrolyzable ester. The polymerization of the furfuryl alcohol oligomer produces water and the water produced by polymerization suppresses the polymerization reaction. If water produced during polymerization of furfuryl alcohol oligomer can be removed, it is possible to force the polymerization reaction to proceed further toward completion and thereby produce longer polymer chains than would result if water were left in the polymer reaction mass. A hydrolyzable ester will remove water as it is produced, leading to the formation of longer chain polymers which result in a stronger, more durable polymer matrix. Accordingly, our preferred diluent for the furfuryl alcohol oligomer is a hydrolyzable ester, preferably alkyl acetates having six carbons or less, with the especially preferred species being butyl acetate.

It is essential that the acid catalyst utilized be oil soluble so that it may be incorporated in the resin solvent solution. This permits thorough mixing of the catalyst which is essential in order to ensure that the polymerization reaction occurs uniformly throughout the entire mass of sand consolidation chemical placed in the formation. Prior art methods which utilize a catalyst injected in a non-miscible fluid either before or after injection of the fluid containing the polymerizable resin, or present in a non-miscible phase or the polymer fluid, do not accomplish uniform reactions such as are possible with the use of the present soluble catalyst. The catalyst in our invention must also be one which exhibits temperature sensitivity such that the catalytic polymerization does not occur during the time that the fluid is prepared and mixed on the surface of the earth or pumped into the formation. It is equally important that once the fluid is placed in the formation and left in a quiescent state for a period of time sufficient to ensure temperature equalization with the formation, that the polymerization reaction occur rapidly in order to permit completion of the procedure in an relatively brief period of time, so the well can be put on production as soon as possible. Because of this dual requirement, the catalyst choice is very critical to the proper function of our invention.

As stated above, the preferred catalyst for use in our process is one which is oil soluble and very slightly water soluble. Suitable catalysts are toluene sulfonic and orthonitrobenzoic acid. The preferred organic acid catalyst is toluene sulfonic acid. This may be used in a concentration from 0.05 to 3.0 and preferably from 1.0 to 2.0 percent by weight of the catalyst based on the total weight of solution of resin, diluent and catalyst.

It has been discovered that by mixing approximately 10% to 70% by volume rubber or latex with the furan resin, the final setting material is superior in both chemical and thermal stability and is also pliable. The preferred amount is about 10–60% rubber, say about 20%, or about 1 part latex to 4 parts of resin.

The rubber can be added in one of several forms. It can be added as a solid or, preferably, in a ground form such as ground tires. Rubber particles of smaller mesh can also be used. Rubber particles can even be finer than 50 mesh and such are available commercially from a number of sources.

The chemical composition of the rubber particles is not critical. Most available scrap is in the form of natural or styrene butadiene rubbers, but others may be employed, such as ethylene propylene diene rubber, ethylene propylene rubber and polyethylene octene elastomer.

As indicated above, a variety of well known rubber materials can be utilized for forming compositions useful in accordance with the present invention. For example, natural rubber (cis-1,4-polyisoprene) in most of its modified types can be utilized. Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), neoprene rubber, nitrile rubber, cis-/tr-1,4-polyisoprene rubber, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The rubber materials are commercially available in latex form, i.e., aqueous dispersions or emulsions which are utilized directly and to which the other components are added.

By using latex instead of ground tires, it is also possible to create a mixture that is totally liquid before setting.

Latex is a white, tacky aqueous suspension of a hydrocarbon polymer occurring naturally in some species of trees, shrubs or plants, or made synthetically. Natural latex is used in the manufacture of thin articles such as, for example, surgeon's gloves, and is used as an adhesive and in foamed products. Synthetic latexes are made by emulsion polymerization techniques from styrene-butadiene copolymer, acrylate resins, polyvinyl acetate, and similar materials. Their particle size is much smaller than natural latex, ranging from 0.05 to 0.15 micron; thus they are more properly colloidal suspensions. Latex is commercially available from Goodrich.

The rubber latex utilized for a particular application is selected to provide the particular properties required for that application. For example, natural rubber is superior to styrene-butadiene rubber with respect to low heat built-up, resilience, tensile strength without reinforcement and hot tear strength. Styrene-butadiene rubber, on the other hand, is more resistant to abrasion and weathering. The rubber latex can be added to the furan resin system in methanol.

The liquid mixtures possible with the embodiment using latex greatly increase the potential applications of a pliable resin particularly to applications such as permanent packing material, bridge plug material, inflatable packer elements, external seal material(between casing and formation), and in surface equipment packers or seals(pumps, stuffing boxes, etc.)

Fillers or extenders can be included in the furan resin/ rubber or latex mixture to improve tensile strength and other properties. Examples of suitable extenders are carbon black, high styrene resins, inorganic fillers such as zinc oxide, amorphous and crystalline silica and other inert fillers such as whiting, clays, synthetic fibers, ground rubber, expanded perlites, natural and synthetic microspheres, and pressurized gas. Others will be apparent to those skilled in the art.

The rubber or latex can be modified to increase or decrease its density as required by particular applications. For example, if a heavy latex is required, density increasing additives can be included and if a lightweight latex is required, it can be foamed with an inert gas such as nitrogen.

Vulcanizable rubber latex as described in U.S. Pat. Nos. 5,159,980 and 5,293,938 is not preferred, because in the present invention the initial resin possesses high temperature stability properties. The use of the vulcanizable latex in the present invention would contribute to heat resistance at the sacrifice of pliability.

The present invention may be subject to many modifications and changes without departing from the spirit or essential characteristics thereof. The following examples should therefore be considered as illustrative and not as limitative to the scope of the invention.

EXPERIMENTAL—EXAMPLE I

A sample of furan resin mixture was prepared and mixed with rubber latex at a 4 to 1 ratio. This mixture was cured overnight at 150° F. The block of cured resin demonstrated flexibility. The block was then placed in an oven at 200° F. for two weeks to see if any flexibility would be lost. None was observed. The block was then placed in a pressure bomb with chlorox (an oxidizer) and put in an oven at 400° F. for one week. No degradation or loss of flexibility was observable.

FIELD EXAMPLE—FLUID ENTRY CONTROL

A producing well is completed in a subterranean petroleum containing formation, the petroleum formation being from 8540 to 8588 feet. Production of oil occurs without sand but, excessive salt water is being produced from a twenty three foot thick zone located thirty feet above the oil production zone. It is decided therefore to inject treatment fluid into the water producing interval of the formation in order to form an impermeable barrier to exclude water from the formation. It is determined that it is sufficient to treat approximately 12 inches (1 foot) into the formation. Based on experience in this field, it is expected that the porosity of the water producing interval formation to be treated is also approximately 40%. The outside casing diameter of the well being treated is ten inches (radius—5 inches or 0.417 ft.). The volume of fluid necessary to treat this portion of formation is determined as follows:

$$V = (\pi(1 - .417^2 - \pi(.417)^2)(23)(.40)$$
$$= (5.76)(23)(.40)$$
$$= 53.0 \text{ Cu. Ft.}$$
$$= 396.6 \text{ Gallons}$$

In order to accomplish adequate saturation of the portion of the unconsolidated sand formation adjacent to the production well, a total of 397 gallons of resin treating fluid is required. The resin employed in this procedure is the "QO-1300®" described above obtained from QO Chemicals, which is an oligomer of furfuryl alcohol. The 397 gallons of treating fluid is formulated by mixing 278 gallons of the above-described resin with 119 gallons of butyl acetate. Since the formation temperature is known to be 60° F., the desired concentration of the mixture of toluene sulfonic acid is 0.1% and oxalic acid is 3%. This requires 3.3 pounds of toluene sulfonic acid and 99 pounds of oxalic acid. In order to facilitate use of toluene sulfonic acid in this application, since the surface ambient temperature is 85° F., a mixture comprising 3.3 pounds toluene sulfonic acid and 12 gallons of methanol is prepared the oxalic acid is added, and then added to the resin-ester mixture. The rubber or latex is added in an approximate ratio of 4 parts resin mixture to 1 parts rubber or latex. Therefore, 100 gallons of latex is added for a total volume of 497 gallons. A retrievable plug is set in the well at a point just below the formation being treated. This fluid is injected into the formation at a rate of about 900 gallons per hour. After all of the treating fluid has been injected into the formation, the well is shut in and is left for a period of 2 hours, which is adequate for this particular formation temperature. The interior of the well is drilled out to remove the hardened resin, and the retrievable plug is removed. At the conclusion of this treatment, the well is placed on production and essentially no water production is obtained from the treated zone.

FIELD EXAMPLE

An oil well penetrating a thirty foot oil-producing interval over which is a 40 foot water-producing interval is producing a fluid mixture of oil and water with the water-oil ratio being about 90, at which point the cost of producing and disposing of the excess water may soon require that the well be shut-in or treated to reduce the water flow. The formation temperature is 230° F. The well casing perforations have established communication with both the oil zone and the water zone, so a bridge plug is set at the boundary between the oil and water-producing interval. It is desired to introduce sufficient fluid into the well so the gravity flow of treating fluid into the formation causes at least a six inch zone adjacent to the well casing to be saturated with the treating fluid. It is thus necessary to introduce a quantity of fluid sufficient to fill the well casing up to the top of the perforations in the water-filled zone and to invade the pore spaces of the water-producing interval for a distance of at least six inches. The wellbore diameter is ten inches, so the volume required to fill the wellbore is $$V = \pi \frac{(10)^2}{(12 \times 2)} (40) = 21.81 \text{ cu. ft.}$$

The volume required to saturate the pore spaces of the formation, whose porosity is 35%, for a distance equal to 5 inches beyond the perforations is equal to $$(0.35 \times 40) \left[ \frac{(10+5)^2}{(2 \times 12)} - (40) - \pi \frac{(10)^2}{(2 \times 12)} \right] = 22.91 \text{ cu. ft.}$$

The total volume to fill the casing and saturate the formation is 21.81+22.91=44.72 cu. ft. or 334 gallons.

A total of 334 gallons of treating fluid is prepared for this operation, which is comprised of 80% QUACOR® 1300 butylacetate, 1% toluene sulfonic acid, and 20% by volume rubber latex. This treating fluid is introduced into the wellbore and allowed to migrate under its own pressure into the water-producing interval in the formation. The set time for this fluid at the formation temperature of about 200° F. is about 8 hours. The treating fluid is allowed to stand in the well for 2 days to ensure that its maximum strength has been obtained before the remaining residual material is drilled out and the well is placed back on production. After the above treatment, the water-production has dropped to 2 barrels per day resulting in a total water/oil ratio of 70, a significant improvement over the condition prior to the application of the present invention.

The furan/rubber pliable seal system could also be used for permanent packing material, inflatable packer elements, external seal material (between casing and formation), and in surface equipment packers or seal materials (i.e. pumps and stuffing boxes)

Although the invention has been described in terms of a series of illustrative examples and preferred embodiments (which applicant believes to include the best mode) for applying his invention known at the time of this application, it will be recognized to those skilled in the art that various modifications may be made to the composition and methods described herein without departing from the true spirit and scope of the invention which is defined more precisely in the claims appended hereinafter below.

We claim:

1. A resin composition useful in well completion and remedial methods, having improved flexibility upon setting which comprises a polymerizable resin,
an oil soluble acid catalyst capable of causing polymerization of the resin at formation temperatures, and
10 to 70% by volume rubber, wherein the rubber is selected from the group consisting of cis-1,4- polvisoprene, styrene-butadiene rubber, cis-1,4-polybutadiene, high styrene resin, butyl rubber, ethylene-propylene rubbers, neoprene rubber, nitrile rubber, cis-/trans 1,4 polyisoprene rubber, silicone rubber, chlorosulfonated polyethylene rubber, crosslinked polyethylene rubber, epichlorohydrin rubber, fluorocarbon rubber, fluorosilicon rubber, polyurethane rubber, and polyacrylic rubber.

2. The resin composition of claim 1 wherein the rubber is ground rubber.

3. The resin composition of claim 2 wherein the rubber is particles of 100 to fines mesh.

4. The resin composition of claim 1 wherein the rubber is an aqueous dispersion or emulsion which is utilized directly.

5. The resin composition of claim 1 wherein the polymerizable resin is an oligomer of furfuryl alcohol.

6. The resin composition of claim 5 wherein the concentration of the furfuryl alcohol oligomer is from 40 to 60% by volume based on the total volume of the resin composition.

7. The resin composition of claim 1 further comprising a polar organic diluent.

8. The resin composition of claim 7 wherein the polar organic diluent is a hydrolyzable ester.

9. The resin composition of claim 8 wherein the concentration of hydrolyzable ester is from 40% to 60% by volume of the resin composition.

10. The resin composition of claim 1 wherein the concentration of oil soluble acid catalyst is from 0.05 to 3.0% by weight based on the total weight of the resin composition.

11. In any method for treating a well using a polymerizable resin selected from a monomer or oligomer of furfural or furfuryl alcohol, the improvement comprising adding 10 to 70% by volume rubber, the rubber being selected from the group consisting of cis-1,4-polyisoprene, styrenebutadiene rubber, cis-1,4-polybutadiene, high styrene resin, butyl rubber, ethylene-propylene rubbers, neoprene rubber, nitrile rubber, cis-/trans 1,4 polyisoprene rubber, silicone rubber, chlorosulfonated polyethylene rubber, crosslinked polyethylene rubber, epichlorohydrin rubber, fluorocarbon rubber, fluorosilicon rubber, polyurethane rubber, and polyacrylic rubber, so as to improve flexibility upon setting of the polymerizable resin.

12. A method of forming a temporary or permanent plug or seal which exhibits improved pliability and resilience in a wellbore or in one or more subterranean formations penetrated by the well bore, the method comprising;

a) placing a composition comprising a polymerizable resin, an oil soluble acid catalyst capable of causing polymerization of the resin at formation temperatures, and 10 to 70% by volume rubber, wherein the rubber is selected from the group consisting of cis-1,4-polyisoprene, styrene-butadiene rubber, cis-1,4-polybutadiene, high styrene resin, butyl rubber, ethylene-propylene rubbers, neoprene rubber, nitrile rubber, cis-/trans 1,4 polyisoprene rubber, silicone rubber, chlorosulfonated polyethylene rubber, crosslinked polyethylene rubber, epichlorohydrin rubber, fluorocarbon rubber, fluorosilicon rubber, polyurethane rubber, and polyacrylic rubber, in said wellbore or one or more subterranean formations at a desired location therein, and b) pertaining said composition to polymerize, so as to form in said location a plug or seal which comprises a pliable furan resin/rubber composite.

13. A method for creating a resin plug in a subterranean formation penetrated by a well, said resin plug being both chemically and thermally stable and pliable when set, the method comprising:

a) providing a fluid comprising a polymerizable resin, a polar organic diluent for the resin, and an oil soluble acid catalyst capable of causing polymerization of the resin at formation temperatures, and 10 to 70% by volume rubber, wherein the rubber is selected from the group consisting of cis-1.4-polyisoprene, styrene-butadiene rubber, cis-1.4-polybutadiene, high styrene resin, butyl rubber, ethylene-propylene rubbers, neoprene rubber, nitrile rubber, cis-/trans 1,4 polyisoprene rubber, silicone rubber, chlorosulfonated polyethylene rubber, crosslinked polyethylene rubber, epichlorohydrin rubber, fluorocarbon rubber, fluorosilicon rubber, polyurethane rubber, and polyacrylic rubber, b) injecting said fluid into the subterranean formation to saturate at least a portion of the subterranean formation adjacent to the well, c) allowing the injected fluids to remain in the formation for a period of time sufficient to accomplish at least partial polymerization of the resin, thereby forming said resin plug around the wellbore.

14. A resin composition having improved flexibility upon setting, the resin composition comprising:

a polymerizable furfuryl alcohol oligomer resin;

an oil soluble acid catalyst capable of causing polymerization of the resin, the oil soluble catalyst being selected from the group consisting of toluene sulfonic acid and orthonitrobenzoic acid;

a polar organic diluent, the polar organic diluent being a hydrolyzable ester; and, ground rubber having a particle size of 100 to fines mesh.

15. The resin composition of claim 14 wherein:

the polymerizable furfuryl alcohol oligomer resin is form 40 to 60% by volume based on the total volume of the resin composition;

the oil soluble acid catalyst is from 0.05 to 3.0% by weight based on the total weight of the resin composition;

the polar organic diluent is from 40 to 60% by volume based on the total volume of the resin composition; and the rubber is 10 to 70% by volume based on the total volume of the resin composition.

\* \* \* \* \*

UNITED STATES PATENT AND TRADEMARK OFFICE
CERTIFICATE OF CORRECTION

PATENT NO. : 5,712,314

DATED : January 27, 1998

INVENTOR(S) : Billy Wayne Surles, et. al.

It is certified that error appears in the above-identified patent and that said Letters Patent is hereby corrected as shown below:

Column 10, Line 47 should read as follows:

the polymerizable furfuryl alcohol oligomer resin is from

Signed and Sealed this

Ninth Day of June, 1998

*Attest:*

BRUCE LEHMAN

*Attesting Officer*     *Commissioner of Patents and Trademarks*